United States Patent
Yin et al.

(10) Patent No.: US 9,904,599 B2
(45) Date of Patent: Feb. 27, 2018

(54) METHOD, DEVICE, AND SYSTEM FOR DATA RECONSTRUCTION

(71) Applicant: Huawei Technologies Co., Ltd., Shenzhen, Guangdong (CN)

(72) Inventors: Yu Yin, Shenzhen (CN); Daohui Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 122 days.

(21) Appl. No.: 14/456,690

(22) Filed: Aug. 11, 2014

(65) Prior Publication Data

US 2014/0351636 A1   Nov. 27, 2014

Related U.S. Application Data

(63) Continuation of application No. PCT/CN2012/070983, filed on Feb. 9, 2012.

(51) Int. Cl.
*G06F 11/00* (2006.01)
*G06F 11/14* (2006.01)
(Continued)

(52) U.S. Cl.
CPC ...... *G06F 11/1446* (2013.01); *G06F 11/1662* (2013.01); *G06F 11/2094* (2013.01);
(Continued)

(58) Field of Classification Search
CPC ............ G06F 11/1464; G06F 11/1662; G06F 11/2094
See application file for complete search history.

(56) References Cited

U.S. PATENT DOCUMENTS 7,685,129 B1    3/2010  LeCrone et al.
8,290,919 B1 * 10/2012  Kelly ............... G06F 17/302
                                                707/698
(Continued)

FOREIGN PATENT DOCUMENTS

CN         1679000 A     10/2005
CN      101154146 A      4/2008
(Continued)

OTHER PUBLICATIONS

Rowstron et al., "Storage management and caching in PAST, a large-scale, persistent peer-to-peer storage utility," 18th Symposium on Operating Principles, Association for Computing Machinery, pp. 188-201 Banff, Canada (Oct. 21-24, 2001).
(Continued)

*Primary Examiner* — Bryce Bonzo
*Assistant Examiner* — Jonathan Gibson
(74) *Attorney, Agent, or Firm* — Leydig, Voit & Mayer, Ltd.

(57) ABSTRACT

A method for data reconstruction includes: obtaining a data migration list, where the data migration list indicates a partition with data to be migrated on a storage node with data to be migrated; generating a data migration task according to the data migration list and routing table information, where the routing table information indicates correspondence between a storage node in a cluster and a partition; and concurrently executing data migration tasks of a storage node in the cluster to reconstruct data. In addition, a device for data reconstruction and a storage system are further provided accordingly.

17 Claims, 5 Drawing Sheets

(51) Int. Cl.
*G06F 11/16* (2006.01)
*G06F 11/20* (2006.01)
*G06F 17/30* (2006.01)
*G06F 11/07* (2006.01)

(52) U.S. Cl.
CPC ...... *G06F 17/303* (2013.01); *G06F 17/30979* (2013.01); *G06F 11/0727* (2013.01); *G06F 11/0757* (2013.01)

(56) References Cited

U.S. PATENT DOCUMENTS

| | | | |
|---|---|---|---|
| 2003/0237019 A1 | 12/2003 | Kleiman et al. | |
| 2006/0206662 A1* | 9/2006 | Ludwig | G06F 3/0607 711/114 |
| 2007/0136469 A1* | 6/2007 | Nusbickel | H04L 67/1008 709/226 |
| 2007/0174660 A1* | 7/2007 | Peddada | H04L 41/0663 714/4.1 |
| 2009/0271412 A1* | 10/2009 | Lacapra | G06F 17/30206 |
| 2011/0010578 A1 | 1/2011 | Agundez Dominguez et al. | |
| 2011/0022882 A1* | 1/2011 | Jaehde | G06F 11/2023 714/4.1 |
| 2011/0078684 A1* | 3/2011 | Luo | G06F 11/3471 718/100 |
| 2011/0191389 A1 | 8/2011 | Okamoto | |
| 2011/0271072 A1 | 11/2011 | Liu et al. | |
| 2011/0271140 A1* | 11/2011 | Katano | G06F 11/0712 714/4.11 |

FOREIGN PATENT DOCUMENTS

| | | |
|---|---|---|
| CN | 101436149 A | 5/2009 |
| CN | 102033794 A | 4/2011 |

OTHER PUBLICATIONS

Houri et al., "Self-organized Data Redundancy Management for Peer-to-Peer Storage Systems," Self-Organizing Systems: 4th International Federation for Information Processing TC 6 International Workshop, Zurich, Switzerland, pp. 65-76 (Dec. 9-11, 2009).

Venkatesan et al., "Effect of Replica Placement on the Reliability of Large-Scale Data Storage Systems," 18th Annual IEEE/ACM International Symposium on Modeling, Analysis and Simulation of Computer and Telecommunication Systems, pp. 79-88, Institute of Electrical and Electronics Engineers, New York, New York (Aug. 17-19, 2010).

* cited by examiner

METHOD, DEVICE, AND SYSTEM FOR DATA RECONSTRUCTION

CROSS-REFERENCE TO RELATED APPLICATIONS

This application is a continuation of International Patent Application No. PCT/CN2012/070983, filed on Feb. 9, 2012, which is hereby incorporated by reference in its entirety.

TECHNICAL FIELD

The present invention relates to the field of computer technologies, and in particular, to a method, a device, and a system for data reconstruction.

BACKGROUND

Along with the development of network technologies, network information ushers in an era of information explosion. Based on people's demand for large-scale data storage, a peer-to-peer (P2P) storage system based on a distributed hash table (DHT) technology has been developed.

Generally, a typical P2P storage system can be simplified to include the following two parts: several clients and several storage nodes. The storage nodes are used to store data, and the clients are used to access the data. A data access form of this storage system is generally as follows: get(key, &value), where key is a unique identifier of data, and value is data content.

Along with longtime operating of the storage system, a disk fault occurs, which is a basic scenario of the storage system. How to restore data quickly in this scenario to improve the reliability of the storage system is a major difficulty in the implementation of the P2P storage system. In the prior art, when partial storage nodes in a cluster are faulty, a data migration task (also known as a load balancing task, that is, a rebalance Task) needs to be manually established for the faulty storage nodes through the P2P storage system, and then partition migrations are performed for the faulty storage nodes according to the data migration task.

During the research and practice of the prior art, the inventor of the present invention finds that in the prior art, data migration takes a longer time because corresponding data migration tasks need to be manually established for faulty storage nodes through a P2P storage system, and then the data migration tasks are executed in sequence.

SUMMARY

Embodiments of the present invention provide a method, a device, and a system for data reconstruction, which can improve the data reconstruction efficiency.

A method for data reconstruction includes: obtaining a data migration list, where the data migration list indicates a partition with data to be migrated on a storage node with data to be migrated; generating a data migration task according to the data migration list and routing table information, where the routing table information indicates correspondence between a storage node in a cluster and a partition; and concurrently executing data migration tasks of a storage node in the cluster to reconstruct data.

A device for data reconstruction includes: an obtaining unit, configured to obtain a data migration list, where the data migration list indicates a partition with data to be migrated on a storage node with data to be migrated; a generating unit, configured to generate a data migration task according to routing table information and the data migration list obtained by the obtaining unit, where the routing table information indicates correspondence between a storage node in a cluster and a partition; and an executing unit, configured to concurrently execute data migration tasks of a storage node in the cluster to reconstruct data.

A storage system includes any device for data reconstruction that is provided in the embodiments of the present invention.

According to the embodiments of the present invention, a data migration list is obtained, a data migration task is generated according to the data migration list and routing table information, and then data migration tasks of a storage node in the cluster are concurrently to reconstruct data. Because the data migration tasks can be concurrently executed, the data reconstruction efficiency can be improved.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

For ease of description, the following briefly describes some concepts involved in a P2P storage system.

(1) Full stripe block storage: referring to a method of segmenting continuous data into data blocks of the same size, and writing each segment of data into a different disk in an array, respectively. It is much faster than read and write speeds that can be provided by a single disk. When transmission of data from a first disk finishes, a second disk can determine a next segment of data.

(2) DHT algorithm: A storage system usually adopts a DHT-based network model, that is, a mapping of a location of any storage node (that is, a physical node) in a network is provided. One storage node is mapped to multiple virtual nodes. In practical, a service is provided externally by a logical volume (VOL) virtualized based on a DHT ring. During storage, data in a logical volume is divided into many small blocks of the same size (for example, 1 MB), and mapped to different partitions on the ring based on hash. All data can set up correspondence with a partition by using a consistent Hash function.

(3) Hash value: There is correspondence between client request data "key-value" and a virtual node. There is a mapping rule for which key-values are placed on which nodes. This mapping rule is set up by hashing a key to calculate a Hash value, and then performing a modulus operation on the Hash value and the total number of virtual nodes, that is, correspondence between a key and a virtual node number is established. By using this Hash value calculation manner, key values requested by an upper-layer application are evenly distributed in a whole cluster. As long as partitions are evenly distributed on physical nodes, data volumes on these physical nodes are also relatively balanced.

Figure 1A:
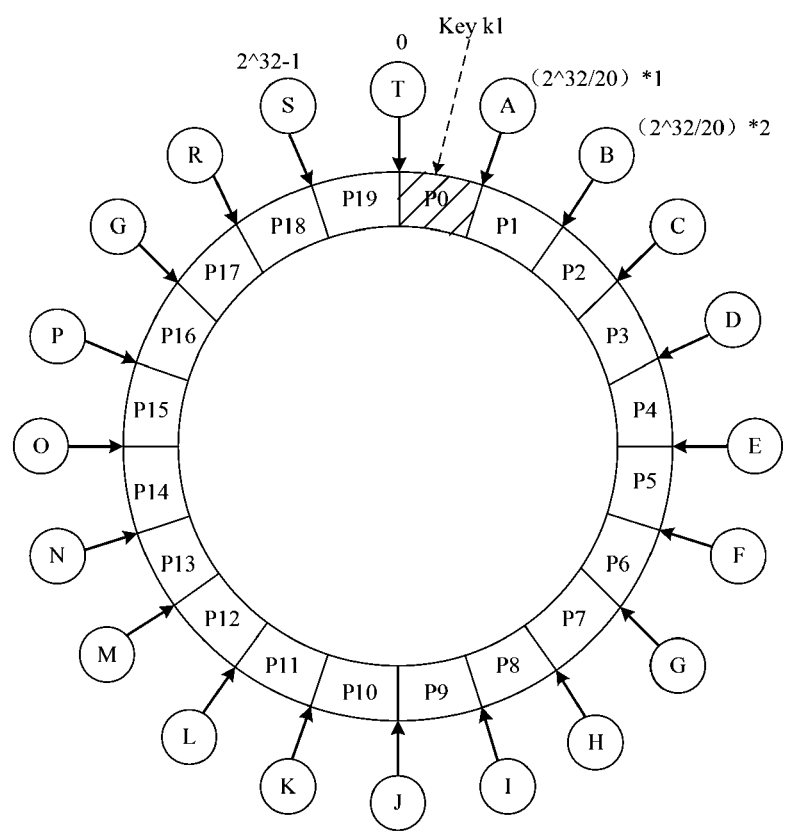
FIG. 1a is a schematic diagram of correspondence between a DHT algorithm and a partition and a storage node.

(4) Storage node, a virtual node, a partition: As shown in FIG. 1a, a physical node corresponds to a hard disk of a physical server. Usually, each hard disk corresponds to one physical node, which is called a storage node. Virtual nodes A to T are differentiated from physical nodes. Data in each partition area is stored corresponding to one virtual node. In this sense, there is a one-to-one relationship between a partition and a virtual node. A partition represents an area after a key is hashed, and a virtual node represents a node that stores this area. A Hash space of the system ranges from 0 to 2^32−1 (where, 2^32−1 indicates the "32−1=31"$^{st}$ power of 2). This integer space is equally divided into N partitions. For example, in FIG. 1a, the integer space in this figure is equally divided into 20 partitions ranging from P0 to P19, where hash value ranges included in all partitions are equal.

After each Key is performed by a Hash calculation, the Hash value will be mapped to a certain partition of the Hash space, and data in each partition is stored on a corresponding virtual node. For example, after key k1 is performed by a Hash calculation, an integer Hash value is mapped to area P0, and key-value data mapped to P0 is stored on node A.

(5) Rebalance task (RT): When partial nodes in a cluster are faulty, partitions on the faulty nodes will be migrated, and a series of plans for inter-node partition migration that are developed are known as a rebalance task, which are called a data migration task in embodiments of the present invention.

The embodiments of the present invention provide a method, a device, and a system for data reconstruction, which are described in detail in the following.

Embodiment 1

This embodiment is described from the aspect of a device for data reconstruction, where the device for data reconstruction may specifically be a client in a storage system or another device such as a control device.

A method for data reconstruction includes: obtaining a data migration list, where the data migration list indicates a partition with data to be migrated on a storage node with data to be migrated; generating a data migration task according to the data migration list and routing table information, where the routing table information indicates correspondence between a storage node in a cluster and a partition; and concurrently executing data migration tasks of a storage node in the cluster to reconstruct data.

The cluster at least includes two storage nodes.

Figure 1B:
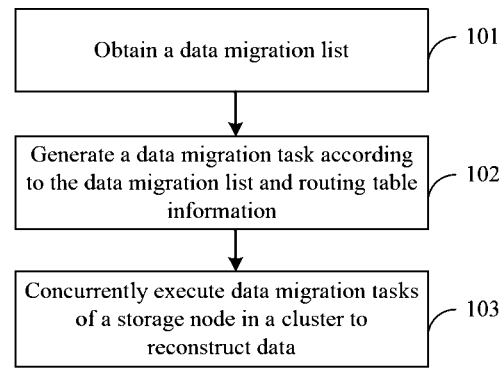
FIG. 1b is a flowchart of a method for data reconstruction according to an embodiment of the present invention.

As shown in FIG. 1b, the specific procedure may be as follows:

101. Obtain a data migration list, where the data migration list indicates a partition with data to be migrated on a storage node with data to be migrated, that is, a storage node with data to be migrated may be determined according to the data migration list, and a partition with data to be migrated on the storage node with data to be migrated may be determined. For example, this step may specifically be as follows:

(1) Obtain status information of a storage node in a cluster.

Status information of a storage node is also known as synchronous heartbeat information. If the status information of the storage node is not available in a certain time window, it may be regarded that the storage node is in a temporarily faulty state; if a fault duration reaches a preset time of the system, for example, X hours, it is regarded that the storage node is in a permanently faulty state, and in this case, a partition of this storage node needs to be migrated to another normal storage node, that is, step (2) is performed.

(2) Adjust a partition according to the obtained status information of the storage node. For example, the step may specifically be as follows:

If the status information of the storage node is not received within a preset time, it is determined that the storage node is a faulty storage node, and the partition on the faulty storage node is migrated to another normal storage node.

Because the partition on the faulty storage node has been migrated to another normal storage node, a storage node (that is, "other normal storage nodes" that receive the migrated partition) to which the partition on the faulty storage node currently belongs needs to migrate data in the partition, so as to restore the data in the partition. That is to say, the storage node (that is, the "other normal storage nodes" that receive the migrated partition) to which the partition on the faulty storage nodes currently belong is the "storage node with data to be migrated" that is described in the embodiments of the present invention.

(3) Update routing table information according to the partition adjustment result, where the routing table information indicates correspondence between a storage node and a partition, and furthermore, the routing table information may further indicate status information of each storage node.

(4) Determine the data migration list according to the routing table information after update (that is, new routing table information) and the routing table information before update (that is, old routing table information).

The data migration list indicates the storage node with data to be migrated, that is, indicates data needs to be migrated from which partition of which storage nodes. The number of the storage nodes with data to be migrated may be one or more.

102. Generate a data migration task according to the data migration list and routing table information, where the routing table information indicates correspondence between a storage node in a cluster and a partition. For example, the step may specifically be as follows:

determining, according to the data migration list, a storage node with data to be migrated currently as a storage node that steals data; determining, by searching the routing table information, storage nodes that store backup data of a partition on the storage node with data to be migrated currently; selecting a storage node from the storage nodes that store the backup data as a storage node that contributes data; and generating a data migration task according to the determined storage node that steals data and the storage node that contributes data.

It should be noted that, for ease of description, in the embodiments of the present invention, a storage node that receives migrated data is called a storage node that steals data, and a storage node from which data is migrated is called a storage node that contributes data. For example, if storage node A includes partition P1, and storage node B stores backup data of partition P1, when storage node A is faulty, and partition P1 is adjusted to storage node C, the data on partition P1 can be migrated from storage node B to partition P1 on storage node C; in this case, storage node C is called a storage node that steals data, and storage node B is called a storage node that contributes data.

103. Concurrently execute data migration tasks of a storage node in the cluster to reconstruct data.

"Concurrently" means that data migration tasks of a storage node in a cluster is executed in parallel, including concurrent execution of data migration tasks between storage nodes and concurrent execution of data migration tasks inside a storage node. Taking storage node A, storage node B, and storage node C as an example, if a data migration task related to storage node A is task 1, a data migration task related to storage node B is task 2, and a data migration task related to storage node C is task 3, where task 1, task 2, and task 3 each includes multiple small tasks (that is, "task in a general migration task queue" in the embodiment of the present invention; reference may be made to Embodiment 2 for details), "concurrently" here includes both concurrent processing of task 1, task 2, and task 3 and concurrent processing of small tasks in task 1, task 2, and task 3.

The concurrently executing data migration tasks of a storage node in the cluster to reconstruct data may specifically be as follows:

copying, according to the data migration tasks, the backup data from the storage node that contributes data to the storage node that needs to steal data currently.

Besides, optionally, if a new storage node is faulty during data reconstruction, a new data migration list needs to be obtained, data migration tasks are integrated according to the new data migration list and the routing table information to obtain integrated data migration tasks, and then the integrated data migration tasks are concurrently executed to reconstruct data. That is to say, in this case, step 102 (that is, generating a data migration task according to the data migration list and routing table information) may specifically be:

when it is determined that a new data migration list is available, integrating data migration tasks according to the new data migration list and the routing table information to obtain integrated data migration tasks. For example, this step may specifically be as follows:

(1) When it is determined that the new data migration list is available, it is determined, according to the new data migration list and the routing table information, a new storage node with data to be migrated, and a new data migration task is generated;

where, the generating a new data migration task is the same as step 102, which is not repeated any further herein.

(2) It is determined whether the new storage node with data to be migrated is the storage node that steals data and/or the storage node that contributes data in the original data migration tasks, and then the following processing is performed respectively according to the determination result:

if the new storage node is only the storage node that steals data in the original data migration tasks, deleting a data migration task about the "new storage node with data to be migrated" from the original data migration tasks, and reserving a new data migration task about the "new storage node with data to be migrated";

if the new storage node is only the storage node that contributes data in the original data migration tasks, reselecting a new node that contributes data for a storage node that needs to steal data from the new storage node with data to be migrated in the original data migration tasks, replacing the "new storage node with data to be migrated" in the original data migration tasks with the new storage node that contributes data, and reserving a new data migration task about the "new storage node with data to be migrated";

if the new storage node is both the storage node that steals data and the storage node that contributes data in the original data migration tasks, deleting data migration tasks that take the "new storage node with data to be migrated" as the storage node that steals data from the original data migration tasks, reselecting a new node that contributes data for a storage node that needs to steal data from the "new storage node with data to be migrated" in the original data migration tasks, replacing the "new storage node with data to be migrated" in the original data migration tasks with the new node that contributes data, and reserving a new data migration task about the "new storage node with data to be migrated"; and if the new storage node is neither the storage node that steals data nor the storage node that contributes data in the original data migration tasks, reserve a new data migration task about the "new storage node with data to be migrated".

Then, step 103 (that is, concurrently executing data migration tasks of a storage node in the cluster to reconstruct data) may specifically be: concurrently executing the integrated data migration tasks of a storage node in the cluster to reconstruct data.

It should be noted that, the integrated data migration tasks are the same as an ordinary data migration task. Therefore, reference may be made to step 103 for a specific method for concurrently executing the integrated data migration tasks, which is not repeated any further herein.

As can be known from above, according to this embodiment, a data migration list is obtained, a data migration task is generated according to the data migration list and routing table information, and then data migration tasks of a storage node in the cluster are concurrently to reconstruct data. Because the data migration tasks can be concurrently executed, the data reconstruction efficiency can be improved.

In the prior art, because maintenance personnel need to create a corresponding data migration task for a faulty storage node through a P2P storage system, if a storage node is faulty after a certain data migration task is created, the maintenance personnel need to create a new data migration task again through the P2P storage system. In this case, repeated data migration tasks may occur, which prolongs data migration time and reduces the data reconstruction efficiency. In the embodiment of the present invention, when it is determined that the new data migration list is available, the data migration tasks can be integrated according to the new data migration list to delete identical data migration tasks. In this way, repeated data migration tasks can be avoided, the data migration time is greatly reduced, and the data reconstruction efficiency is further improved.

Embodiment 2

Based on the method described in embodiment 1, the following gives more details through examples.

A storage system creates multiple copies for a data file by means of redundancy backup. These copies are called data backups. In this way, when the storage system is faulty, data can be restored through these data backups. The following assumes that a storage node cluster has 12 storage nodes (that is, 12 disks), and each partition has three data backups.

Figure 2A:
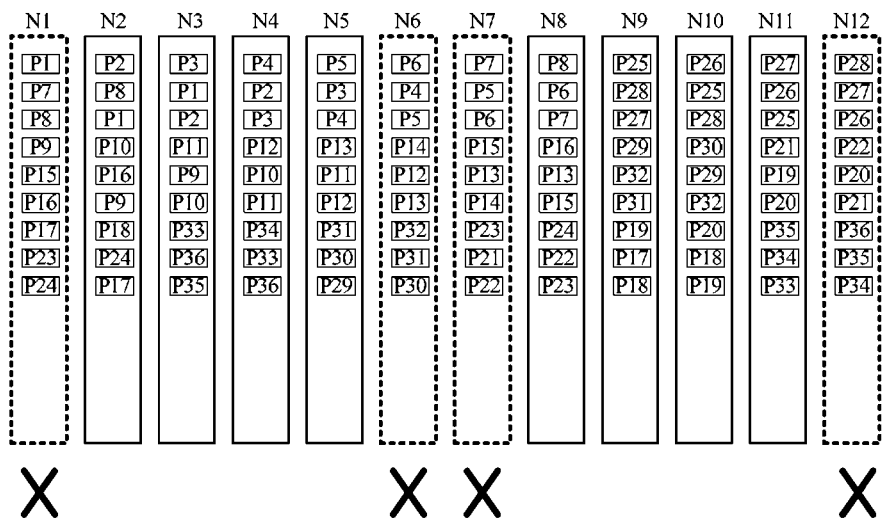
FIG. 2a is a schematic diagram of original correspondence between a storage node and a partition in a storage system.

Referring to FIG. 2a, the storage node cluster of the storage system includes 12 storage nodes N1 to N12, where each storage node includes several partitions and each partition has three pieces of backup data. For example, original routing table information (that is, correspondence between a storage node and a partition) may specifically be as follows:

N1(1, 7', 8", 9, 15', 16", 17, 23', 24");
N2(2, 8', 1", 10, 16', 9", 18, 24', 17");
N3(3, 1', 2", 11, 9', 10", 33, 36', 35");
N4(4, 2', 3", 12, 10', 11", 34, 33', 36");
N5(5, 3', 4", 13, 11', 12", 31, 30', 29");
N6(6, 4', 5", 14, 12', 13", 32, 31', 30");
N7(7, 5', 6", 15, 13', 14", 23, 21', 22");
N8(8, 6', 7", 16, 14', 15", 24, 22', 23");
N9(25, 28', 27", 29, 32', 31", 19, 17', 18");
N10(26, 25', 28", 30, 29', 32", 20, 18', 19");
N11(27, 26', 25", 21, 19', 20", 35, 34', 33");
N12(28, 27', 26", 22, 20', 21", 36, 35', 34").

Numbers in brackets respectively correspond to partition "P" in FIG. 2a, and (p, p', p") represents three different data backups of one partition, for example, (1,1',1") corresponds to partition "P1" in FIG. 2a and represents three data backups of P1. As can be known from the foregoing correspondence between a storage node and a partition, the three data backups of partition "P1" are stored on storage nodes N1, N2, and N3.

Figure 2B:
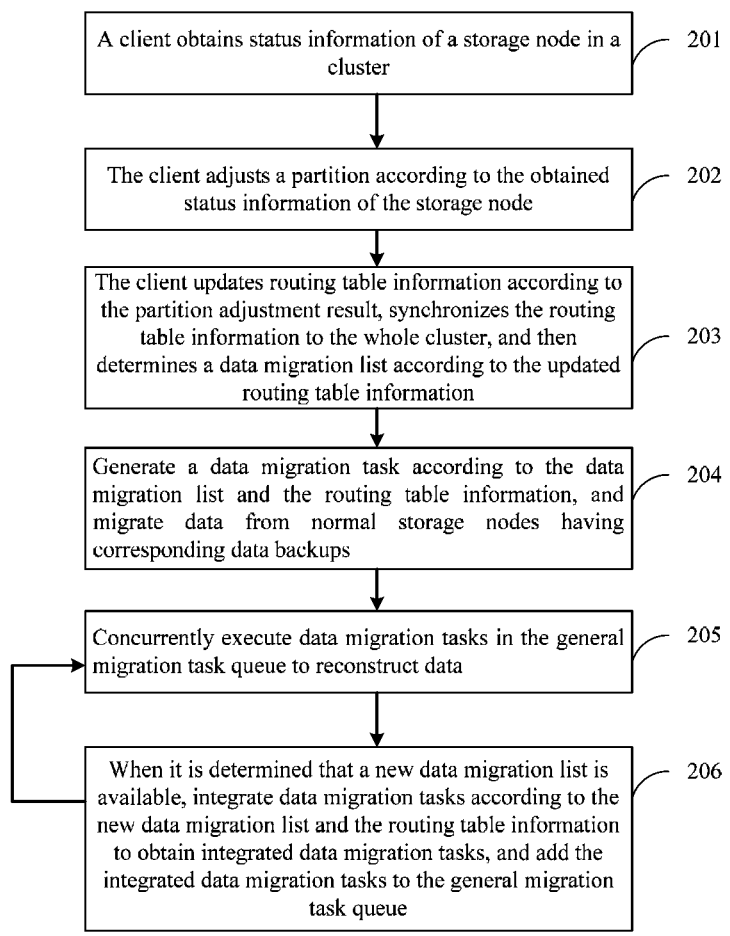
FIG. 2b is another flowchart of a method for data reconstruction according to an embodiment of the present invention.

As shown in FIG. 2a, if four disks such as storage nodes N1, N6, N7, and N12 (as shown by dashed lines in FIG. 2a) become faulty consecutively, as shown in FIG. 2b, a data reconstruction process of the storage system may specifically be as follows:

201. A client in the storage system obtains status information of a storage node in a cluster.

It should be noted that, the client stores routing table information of the whole cluster, where the routing table information includes correspondence between a storage node and a partition and status information of each storage node.

202. The client adjusts a partition according to the obtained status information of the storage node, that is, changes the correspondence between a storage node and a partition according to the obtained status information of the storage node. For example, the specific procedure may be as follows:

Because the system periodically obtains the status information of the storage node in the cluster through the client, if the status information of the storage node is not available in a certain time window, it may be regarded that the storage node is in a temporarily faulty state; if a fault duration reaches a preset time of the system, for example, X hours, it is regarded that the storage node is in a permanently faulty state, that is, it is determined that the storage node is a faulty storage node.

If a storage node is a faulty storage node, it may be regarded that data in all partitions of the storage node is erroneous. In this case, the partitions on the faulty storage node need to be migrated to another normal storage node.

Specifically, a partition may be adjusted in any way, for example, all the partitions on the faulty storage node may be specifically migrated to a normal storage node, or all the partitions on the faulty storage nodes may be migrated to several normal storage nodes, and so on. Certainly, to ensure that the partitions are evenly distributed, the partitions on the faulty storage node can be evenly distributed to all normal storage nodes as far as possible, so that the numbers of partitions on all normal storage nodes are basically equal. For example, the specific method adopted by this embodiment is that adjustment is performed according to the number of partitions to be migrated from the faulty storage node and the number of partitions to be migrated to each normal node to ensure that the number of partitions in each node of the cluster is basically the same (average number of partitions=number of all partitions/number of normal nodes). During the adjustment, traversing is performed according to node and partition numbers, and a final adjustment result is that some partitions are added to other normal storage nodes.

Figure 2C:
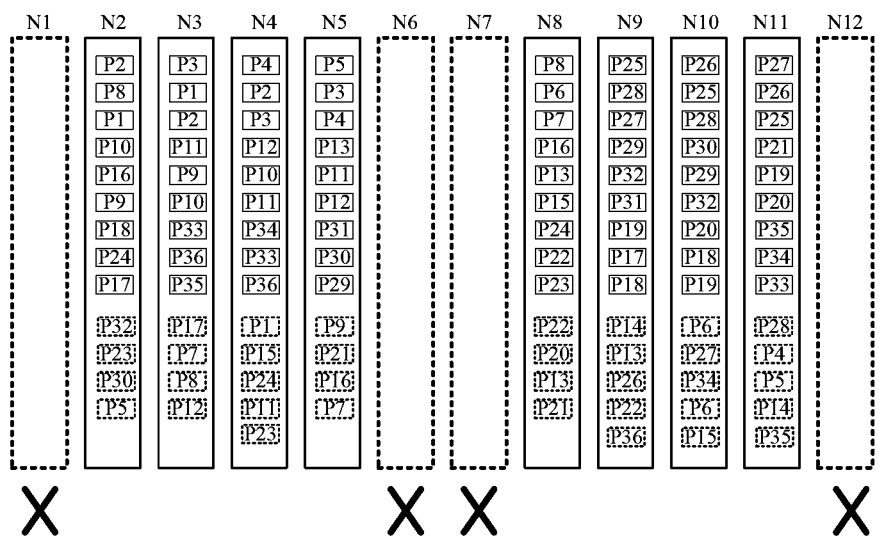
FIG. 2c is a schematic diagram of correspondence between a storage node and a partition obtained after a first partition adjustment.

Referring to FIG. 2c, it is a schematic diagram of correspondence between a storage node and a partition obtained through partition adjustment after storage nodes N1, N6, N7, and N12 are faulty (that is, a schematic diagram of correspondence between a storage node and a partition after a first partition adjustment). Partitions marked by dashed lines in a storage node represent the partitions newly added to the storage node. As can be seen from FIG. 2c, partition lists of storage nodes N1, N6, N7, and N12 are empty because all their partitions are migrated to other normal storage nodes. The correspondence between a storage node and a partition after the partition adjustment may specifically be as follows:

N1( );
N2(2, 8', 1", 10, 16', 9", 18, 24', 17", 32, 23', 30", 5');
N3(3, 1', 2", 11, 9', 10", 33, 36', 35", 17, 7', 8", 12');
N4(4, 2', 3", 12, 10', 11", 34, 33', 36", 1, 15', 24", 31', 23);
N5(5, 3', 4", 13, 11', 12", 31, 30', 29", 9, 21', 16", 7);
N6( );
N7( );
N8(8, 6', 7", 16, 14', 15", 24, 22', 23", 22, 20', 13', 21");
N9(25, 28', 27", 29, 32', 31", 19, 17', 18", 14, 13', 26", 22", 36);
N10(26, 25', 28", 30, 29', 32", 20, 18', 19", 6, 27', 34", 6", 15);
N11(27, 26', 25", 21, 19', 20", 35, 34', 33", 28, 4', 5", 14", 35');
N12( ).

Underlined parts are partitions newly added to storage nodes.

203. The client updates routing table information according to the partition adjustment in step 202, synchronizes the routing table information to the whole cluster, and then determines a data migration list according to the routing table information after update and the routing table information before update.

The routing table information indicates the correspondence between a storage node and a partition, and may further indicate status information of each storage node. The data migration list indicates a partition with data to be migrated on the storage node with data to be migrated, that is, indicates data is migrated from which partition of which storage nodes. The number of the storage nodes with data to be migrated may be one or more. For example, according to the partition adjustment in step 202, new partitions are added on storage nodes N2, N3, N4, N5, N8, N9, N10, and N11, and therefore, data needs to be migrated to storage nodes N2, N3, N4, N5, N8, N9, N10, and N11. Then, a list of a partition with data to be migrated on storage nodes N2, N3, N4, N5, N8, N9, N10, and N11 is the data migration list.

204. Generate a data migration task according to the data migration list and the routing table information, and migrate data from normal storage nodes having corresponding data backups.

As can be known from the correspondence between a storage node and a partition after the partition adjustment shown in FIG. 2c and the original correspondence between a storage node and a partition shown in FIG. 2a, data of each partition in the cluster is backed up on another two storage nodes. Therefore, data backups can be obtained from any one of the two storage nodes to restore data. For example, the specific procedure may be as follows:

Firstly, a storage node with data to be migrated currently may be specifically determined, according to the data migration list, as a storage node that steals data. For example, in FIG. 2c, the data migration list indicates that storage nodes with data to be migrated include N2, N3, N4, N5, N8, N9, N10, and N11, and in this case, it can be first determined that N2 is the storage node with data to be migrated currently; after data on N2 is migrated, it is determined that N3 is the storage node with data to be migrated currently, so as to perform data migration, and so on, until data of all "storage nodes with data to be migrated" in the data migration list is migrated completely.

Secondly, storage nodes that store backup data of a partition on the storage node with data to be migrated currently may be determined by searching the routing table information, and a storage node is selected from the storage nodes that store backup data as a storage node that contributes data. For example, on storage node N2, partitions with data to be migrated are P32, P23, P30, and P5; it may be found from the routing table information (the routing table information stores the correspondence between a storage node and a partition) that, a data backup of P32 is stored on storage nodes N9 and N10; in this case, a storage node that can contribute data may be selected from storage nodes N9 and N10 according to a preset policy, for example, N9 is selected as the storage node that contributes data. The preset policy may be set according to actual application requirements.

After the storage node that steals data and the storage node that contributes data are determined, a data migration task may be generated according to the determined storage node that steals data and the storage node that contributes data.

For example, data migration tasks can be specifically classified into tasks of three levels: general migration task queue (RebalancingTaskQueue), tasks (rebalanceTaskn) in the general migration task queue, and tasks between two storage nodes, which are described as follows:

(1) General Migration Task Queue

The general migration task queue may include n tasks, for example, rebalanceTask1, rebalanceTask2, rebalanceTask3, and so on. n indicates a data migration task created for the cluster each time when a disk fault occurs.

(2) Tasks in the General Migration Task Queue

Tasks created by the storage system according to the number of faulty storage nodes in the cluster correspond to faulty storage nodes. Generally, one faulty storage node corresponds to one task. After these tasks are generated, they are put into the general migration task queue for execution. For example, a data migration task generated after a first fault may be called rebalanceTask1, a data migration task generated after a second fault may be called rebalanceTask2, and so on.

(3) Task Between Two Storage Nodes

Tasks in each general migration task queue may include at least one "task between two storage nodes". The so-called task between two storage nodes refers to a data migration task between two specific storage nodes, of which one is a storage node that steals data and the other is a storage node that contributes data. The task between two storage nodes may be specifically expressed by X<---Y partitions[k], where X is the storage node that steals data, Y is the storage node that contributes data, and partitions[k] represents partition k on node Y. For example, 2<---9 partitions[32] means that node 2 steals data of partition 32 from node 9.

For example, according to the partitions added on storage nodes N2, N3, N4, and N5 in step 202, the following "tasks between two storage nodes" can be created:

2<---9 partitions[32];
3<---9 partitions[17];
4<---3 partitions[1];
5<---2 partitions[16];
2<---10 partitions[30];
3<---8 partitions[7,8];
4<---8 partitions[15,23,24];
5<---3 partitions[9];
2<---5 partitions[5];
3<---5 partitions[12];
4<---9 partitions[31];
5<---8 partitions[7];
2<---8 partitions[23];
5<---11 partitions[21];
. . . , and so on.

Taking storage node N2 as an example, Partition32 is originally a partition on storage node 6; because storage node 6 is faulty, data can only be migrated from storage node N9 or N10 that stores a data backup of Partition32, and when a task is created, a storage node of the partition with data to be migrated finally is displayed; for example, in the foregoing task, storage node N9 is displayed. Besides, it should be noted that, one storage node may steal multiple data backups from another storage node, for example, 4<---8 partitions[15,23,24] indicates that storage node N4 steals data of three partitions: partition15 (that is, P15), partition 23 (that is, P23), and partition 24 (that is, P24) from storage node N8.

205. Concurrently execute data migration tasks in the general migration task queue to reconstruct data. For example, the step may specifically be as follows:

Firstly, the storage node that needs to steal data currently is determined; secondly, a data migration task belonging to the storage node that needs to steal data currently is determined; then, the data migration task belonging to the storage node that needs to steal data currently is executed to reconstruct data.

For example, in the example of this embodiment, there are eight storage nodes that steal data, which are N2, N3, N4, N5, N8, N9, N10, and N11, respectively, and for storage node N2, it has four data migration tasks: 2<---9 partitions [32], 2<---8 partitions[23], 2<---10 partitions[30], and 2<---5 partitions[5]. Therefore, if it is determined that storage node N2 is the storage node that needs to steal data currently, the four data migration tasks belonging to storage node N2 are concurrently executed. The method of determining another storage node is the same as this method, which is not repeated any further herein.

In addition, besides that data migration tasks inside a storage node need to be concurrently executed as described above, tasks between storage nodes may also be concurrently executed, that is, N2, N3, N4, N5, N8, N9, N10, and N11 are concurrently processed.

206. When it is determined that a new data migration list is available, integrate data migration tasks according to the new data migration list and the routing table information to obtain integrated data migration tasks, add the integrated data migration tasks to the general migration task queue, concurrently execute the tasks in the general migration task queue, and then return to step 205. The step may specifically be as follows:

When it is determined that the new data migration list is available, it is determined, according to the new data migration list and the routing table information (including the routing table information after update and the routing table information before update), a new storage node with data to be migrated, and a new data migration task is generated, and then, it is determined whether the new storage node with data to be migrated is the storage node that steals data and/or the storage node that contributes data in the original data migration tasks, and the following processing is performed respectively according to a determination result:

(1) If the new storage node is only the storage node that steals data in the original data migration tasks, two types of tasks are involved: the first type is that data of the storage node itself needs to be restored, and the second type is that data that is not stolen from the storage node needs to be stolen from another storage node. Therefore, in this case, the following operations may be performed to integrate data migration tasks:

deleting a data migration task about the "new storage node with data to be migrated" from the original data migration tasks, and reserving a new data migration task about the "new storage node with data to be migrated".

(2) If the new storage node is only the storage node that contributes data in the original data migration tasks, two types of tasks are involved: the first type is that data of the storage node itself needs to be restored, and the second type is that a storage node that originally steals data from this storage node needs to steal data from another storage node. Therefore, in this case, the following operations may be performed to integrate data migration tasks:

reselecting a new node that contributes data for a storage node that needs to steal data from the new storage node with data to be migrated in the original data migration tasks, replacing the "new storage node with data to be migrated" in the original data migration tasks with the new storage node that contributes data, and reserving a new data migration task about the "new storage node with data to be migrated".

(3) If the new storage node is both the storage node that steals data and the storage node that contributes data in the original data migration tasks, three types of tasks will be involved: a first type is that data of the storage node itself needs to be restored, a second type is that data that is not stolen from the storage node needs to be stolen from another storage node, and a third type is that a storage node that originally steals data from this storage node needs to steal data from another storage node. Therefore, in this case, the following operations may be performed to integrate data migration tasks:

deleting data migration tasks that take the "new storage node with data to be migrated" as the storage node that steals data from the original data migration tasks, reselecting a new node that contributes data for a storage node that needs to steal data from the "new storage node with data to be migrated" in the original data migration tasks, replacing the "new storage node with data to be migrated" in the original data migration tasks with the new storage node that contributes data, and reserving a new data migration task about the "new storage node with data to be migrated".

(4) If the new storage node is neither the storage node that steals data nor the storage node that contributes data in the original data migration tasks, only one type of task will be involved, that is, data of the storage node itself is restored. Therefore, in this case, the following operation may be performed to integrate data migration tasks:

reserving a new data migration task about the "new storage node with data to be migrated".

For example, when a new storage node in the cluster is faulty before the single task rebalanceTask1 in step 205 is executed completely, a new task rebalanceTask2 will be triggered. The following assumes that storage node N2 is faulty.

Figure 2D:
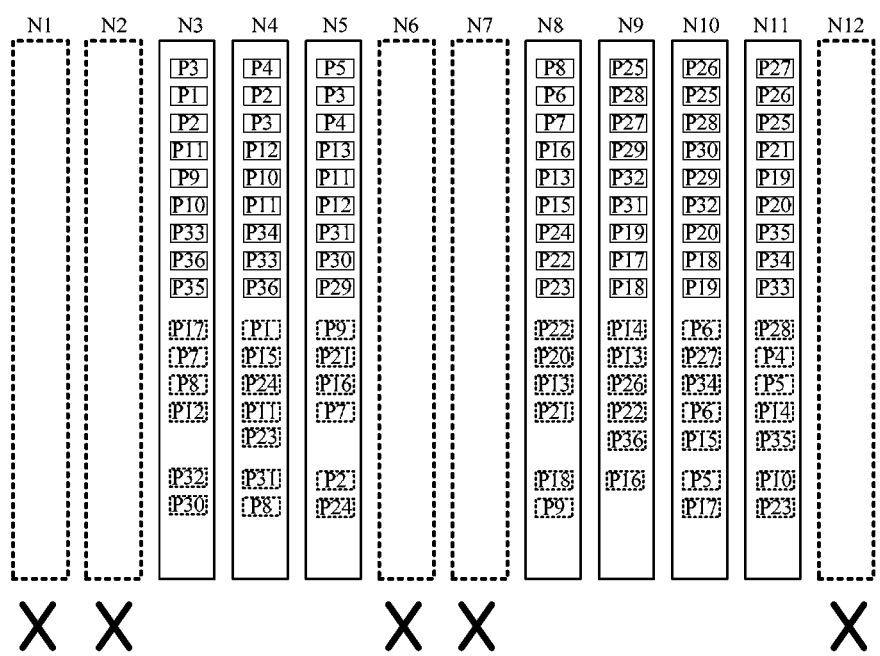
FIG. 2d is a schematic diagram of correspondence between a storage node and a partition obtained after a second partition adjustment.

As shown in FIG. 2d, it is a schematic diagram of correspondence between a storage node and a partition obtained through partition adjustment after storage node N2 is faulty (that is, a schematic diagram of correspondence between a storage node and a partition after a second partition adjustment), which reflects partition changes on each storage node after storage node N2 is faulty and partitions on storage node N2 are migrated to other normal storage nodes.

As can be seen from FIG. 2d, because partitions of storage node N2 are all migrated to other normal storage nodes, a partition list of storage node N2 is empty. The correspondence between a storage node and a partition after the partition adjustment may specifically be as follows:

N1( );
N2( );
N3(3, 1', 2", 11, 9', 10", 33, 36', 35", 17, 7', 8", 12', 32, 30");
N4(4, 2', 3", 12, 10', 11", 34, 33', 36", 1, 15', 24", 31', 23, 1", 8');
N5(5, 3', 4", 13, 11', 12", 31, 30', 29", 9, 21', 16", 7, 2, 24');
N6( );
N7( );
N8(8, 6', 7", 16, 14', 15", 24, 22', 23", 22, 20', 13', 21", 18, 9");
N9(25, 28', 27", 29, 32', 31", 19, 17', 18", 14, 13', 26", 22", 36, 16");
N10(26, 25', 28", 30, 29', 32", 20, 18', 19", 6, 27', 34", 6", 15, 5', 17");
N11(27, 26', 25", 21, 19', 20", 35, 34', 33", 28, 4', 5", 14", 35', 10, 23');
N12( ).

Underlined parts are partitions (that is, partitions added after the second partition adjustment) added to storage nodes after storage node N2 is faulty. It should be noted that, a number that is in bold but is not underlined indicates a partition added after the first partition adjustment. Reference may be made to step 202 for details.

Because the faulty storage node N2 is both the storage node that steals data and the storage node that contributes data, and furthermore, because tasks on N2 need to be changed after N2 is faulty, three types of tasks will be involved: a first type is that data on N2 itself needs to be restored, a second type is that data that is not stolen from N2 needs to be stolen from another storage node, and a third type is that a storage node that originally steals data from storage node N2 needs to steal data from another storage node.

For the first type of task, the data of storage node N2 itself may be restored according to a first partition adjustment result. As can be known from the correspondence between a storage node and a partition obtained after the first partition adjustment, storage node N2 itself has nine partitions, that is, data of partition[2, 8', 1", 10, 16', 9", 18, 24', 17"] needs to be restored. Here, data migration tasks that can be obtained are as follows:

4<---3 partitions[1];
4<---8 partitions[8];
5<---4 partitions[2];
5<---8 partitions[24];
8<---3 partitions[9];
8<---10 partitions[18];
9<---8 partitions[16];
10<---9 partitions[17];
11<---3 partitions[10].

For the second type of task, data that needs to be stolen from partitions of storage node N2 may be restored according to a second partition adjustment result, that is, data that needs to be migrated in the original data migration tasks (that is, rebalanceTask1). As can be known from the correspondence between a storage node and a partition obtained after the first partition adjustment, storage node N2 has four partitions where data needs to be stolen, that is, data of partition[32, 23', 30", 5'] needs to be restored. In this case, corresponding to partition changes after storage node N2 is faulty, tasks in rebalanceTask1 may be directly canceled, and the tasks become the second type of tasks in rebalanceTask2. In this way, data migration tasks do not fail and data is not lost. That is to say, here, data migration tasks that can be obtained are as follows:

3<---9 partitions[32];
11<---10 partitions[30];
3<---8 partitions[23];
10<---8 partitions[5].

For the third type, a storage node that steals data from storage node N2 needs to steal data from another storage node, for example, for task 5<---2 partitions[16] in rebalanceTask1, storage node N2 needs to be changed to a normal storage node N8, that is, the task becomes 5<---8 partitions [16].

These three types of tasks are recombined into an integrated data migration task, that is, rebalanceTask2, which is as follows:

4<---8 partitions[8];
5<---4 partitions[2];
5<---8 partitions[24];
8<---3 partitions[9];
8<---10 partitions[18];
9<---8 partitions[16];
10<---9 partitions[17];
11<---3 partitions[10];
3<---9 partitions[32];
11<---10 partitions[30];
3<---8 partitions[23];
10<---8 partitions[5];
5<---8 partitions[16].

Tasks in rebalanceTask2 are directly added to the general migration task queue, and the tasks in general migration task queue are concurrently executed, that is, the process goes back to step 205.

It should be noted that, although the correspondence between a storage node and a partition changes, the client, when writing or reading data, only needs to determine positions of partitions, and does not care which storage node the partitions belong to. Therefore, after the storage node is faulty, when data migration tasks are concurrently executed, the read and write process is not affected. The following gives brief descriptions about this.

(I) Write Process (Put Process)

Taking storage node D as an example, after storage node D is faulty, a whole write process for migrating partitions of storage node D to a new storage node C may specifically be as follows:

Step A1: The client requests to write in data (key=abc, value=111). After a hash operation (Hash) is performed for the key, an obtained Hash value is 6. Because the total number of original partitions is 16, after a modulus operation is performed for the total number "16" of partitions according to the Hash value, a value 6 is obtained. Therefore, it can be determined that data needs to be written into partition P6, and correspondence between the key and the partition can be established. Similarly, other key values can also establish correspondence with partitions, which is not repeated any further herein.

After it is determined that the data needs to be written into partition P6, it is found by searching the routing table information that, partition P6 is on storage node D. Therefore, the requested data (key=abc, value=111) can be written into storage node D.

Step A2: If storage node D is faulty and cannot implement communication, create a data migration task to migrate partitions on storage node D to another normal storage node, and update the routing table information. For example, migrate partition P6 to storage node C and update the routing table information.

Step A3: The client obtains the updated routing table information, determines that partition P6 is on storage node C, and writes data into storage node C.

Therefore, although the correspondence between a storage node and a partition changes, and the data migration tasks need to be executed to reconstruct data, the data (key=abc, value=111) requested by the client to write can still be successfully written into storage node C without any influence.

(II) Read Process (that is, Get Process)

Storage node D is still used as an example. After storage node D is faulty, a whole read process for migrating partitions of storage node D to the new storage node C may specifically be as follows:

Step B1: The client requests to read data (key=abc, value=111), and performs a hash operation (Hash) for the key to obtain a Hash value 6. Because the total number of original partitions is 16, the client performs a modulus operation for the total number "16" of partitions according to the Hash value to obtain a value 6, and therefore, determines that corresponding data can be read from partition P6, and establishes correspondence between the key and the partition. Similarly, other key values can also establish correspondence with partitions, which is not repeated any further herein.

After it is determined that the data can be read from partition P6, it is found by searching the routing table information that, partition P6 is on storage node D. Therefore, the requested data (key=abc, value=111) can be obtained from storage node D.

Step B2: If storage node D is faulty and cannot implement communication, create a data migration task to migrate partitions on storage node D to another normal storage node, and update the routing table information. For example, migrate partition P6 to storage node C and update the routing table information.

A data backup of partition P6 is stored on storage node B. Therefore, storage node C needs to steal data from storage node B.

Step B3: The client obtains the updated routing table information, determines that partition P6 is on storage node C, and reads data required from storage node C. Data of partition P6 on storage node C needs to be migrated from storage node B (that is, steal data from storage node B). In this case, during reading, storage node C may be migrating data, and not all data of partition P6 on storage node B is migrated to storage node C. Therefore, it is possible that data in partition P6 is not read from storage node C, but in this case, the read request can be redirected to storage node B, so that the client can still access corresponding data correctly.

Therefore, although the correspondence between a storage node and a partition changes, and the data migration tasks need to be executed to reconstruct data, the data (key=abc, value=111) requested by the client to read can still be successfully read without any influence.

As can be known from above, according to the embodiment of the present invention, data migration tasks are concurrently executed, and the data restoring speed is increased, thereby improving the data reconstruction efficiency. In addition, when it is determined that a new data migration list is available, data migration tasks can be integrated according to the new data migration list and the routing table information to cancel identical migration tasks, which avoids repeated data migration tasks, greatly reduces data migration time and further improves the data reconstruction efficiency while ensuring that the data migration tasks do not fail due to storage node faults. Further, during the data reconstruction, read and write request operations are not affected, which ensures the storage system reliability.

Embodiment 3

Figure 3:
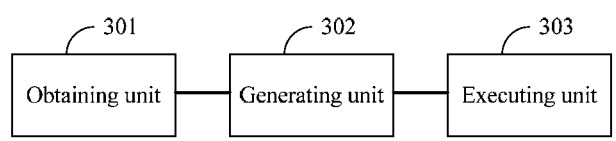
FIG. 3 is a schematic structural diagram of a device for data reconstruction according to an embodiment of the present invention.

To better implement the foregoing method, the embodiment of the present invention further provides a device for data reconstruction that may serve as a client of a storage system. As shown in FIG. 3, the device for data reconstruction includes an obtaining unit 301, a generating unit 302, and an executing unit 303, where the obtaining unit 301 is configured to obtain a data migration list, where the data migration list indicates a partition with data to be migrated on a storage node with data to be migrated;

the generating unit 302 is configured to generate a data migration task according to routing table information and the data migration list obtained by the obtaining unit 301, where the routing table information indicates correspondence between a storage node in a cluster and a partition; and the executing unit 303 is configured to concurrently execute data migration tasks of a storage node in the cluster to reconstruct data.

Besides, optionally, if a new storage node is faulty during data reconstruction, a new data migration list needs to be obtained, data migration tasks are integrated according to the new data migration list and the routing table information to obtain integrated data migration tasks, and then the integrated data migration tasks are concurrently executed to reconstruct data. That is to say, the generating unit 302 is further configured to: when it is determined that a new data migration list is available, integrate data migration tasks according to the new data migration list and the routing table information to obtain the integrated data migration tasks; and the executing unit is configured to concurrently execute the integrated data migration tasks of a storage node in the cluster to reconstruct data; for example, the executing unit may specifically copy, according to the data migration tasks, backup data from a storage node that contributes data to a storage node that needs to steal data currently. Refer to the foregoing method embodiment, and details are not repeated any further herein.

The obtaining unit 301 may include an obtaining subunit, an adjusting subunit, an updating subunit, and a determining subunit.

The obtaining subunit is configured to obtain status information of the storage node in the cluster.

Status information of a storage node is also known as synchronous heartbeat information. If the status information of the storage node is not available in a certain time window, it may be regarded that the storage node is a temporarily faulty state; and if a fault duration reaches a preset time of the system, for example, X hours, it is regarded that the storage node is in a permanently faulty state.

The adjusting subunit is configured to adjust a partition according to the status information of the storage node that is obtained by the obtaining subunit.

The updating subunit is configured to update the routing table information according to the partition adjustment result, where the routing table information indicates the correspondence between a storage node in the cluster and a partition, and furthermore, the routing table information may further indicate status information of each storage node.

The determining subunit is configured to determine the data migration list according to the routing table information updated by the updating subunit and the routing table information before update.

The adjusting subunit is specifically configured to: if status information of the storage node is not received within a preset time, determine that the storage node is a faulty storage node, and migrate a partition on the faulty storage node to another normal storage node. In this case, the "another normal storage node" is called a storage node with data to be migrated.

The generating unit 302 may specifically include a processing subunit and a generating subunit, where the processing subunit is configured to determine, according to the data migration list, a storage node with data to be migrated currently as a storage node that steals data, determine, by searching the routing table information, storage nodes that store backup data of a partition on the storage node with data to be migrated currently, and select a storage node from the storage nodes that store the backup data as a storage node that contributes data; and the generating subunit is configured to generate the data migration task according to the storage node that steals data and the storage node that contributes data, which are determined by the processing subunit.

In addition, the generating unit 302 may include the generating subunit and an integrating subunit, where the generating subunit is configured to: when it is determined that the new data migration list is available, determine, according to the new data migration list, a new storage node with data to be migrated, and generate a new data migration task; and the integrating subunit is configured to determine whether the new storage node with data to be migrated is the storage node that steals data and/or the storage node that contributes data in the original data migration tasks, and then performs the following operations:

if the new storage node is only the storage node that steals data in the original data migration tasks, deleting a data migration task about the new storage node with data to be migrated from the original data migration tasks, and reserving a new data migration task about the new storage node with data to be migrated;

if the new storage node is only the storage node that contributes data in the original data migration tasks, reselecting a new node that contributes data for a storage node that needs to steal data from the new storage node with data to be migrated in the original data migration tasks, replacing the new storage node with data to be migrated in the original data migration tasks with the new storage node that contributes data, and reserving a new data migration task about the new storage node with data to be migrated;

if the new storage node is both the storage node that steals data and the storage node that contributes data in the original data migration tasks, deleting a data migration task that takes the new storage node with data to be migrated as the storage node that steals data from the original data migration tasks, reselecting a new node that contributes data for a storage node that needs to steal data from the new storage node with data to be migrated in the original data migration tasks, replacing the new storage node with data to be migrated in the original data migration tasks with the new node that contributes data, and reserving a new data migration task about the new storage node with data to be migrated; or if the new storage node is neither the storage node that steals data nor the storage node that contributes data in the original data migration tasks, reserving a new data migration task about the new storage node with data to be migrated.

It should be noted that, although the correspondence between a storage node and a partition changes, the client, when writing or reading data, only needs to determine positions of partitions, and does not care which storage node the partitions belong to. Therefore, after the storage node is faulty, when data migration tasks are concurrently executed by the executing unit 303, the read and write process is not affected. Reference may be made to descriptions in Embodiment 2 for details, which are not repeated any further herein.

During specific implementation, the above units may be implemented as separate entities, or may be combined in any way and implemented as one or several entities. Reference may be made to the foregoing method embodiment for the specification implementation of the above units, and details are not repeated any further herein.

As can be known from above, the obtaining unit 301 of the device for data reconstruction according to this embodiment can obtain a data migration list, the generating unit 302 generates a data migration task according to the data migration list and routing table information, and then the executing unit 303 concurrently executes data migration tasks of a storage node in the cluster to reconstruct data Because the data migration tasks can be concurrently executed, the data reconstruction efficiency can be improved. In addition, when it is determined that a new data migration list is available, the integrating subunit can integrate data migration tasks according to the new data migration list and the routing table information to delete identical data migration tasks. In this way, repeated data migration tasks can be avoided, data migration time is greatly reduced, and the data reconstruction efficiency is improved. Further, during the data reconstruction, read and write request operations are not affected, which ensures the storage system reliability.

Embodiment 4

Correspondingly, the embodiment of the present invention further provides a storage system, which may include any device for data reconstruction that is provided in the embodiment of the present invention. Reference may be made to Embodiment 3 for specific descriptions of the device for data reconstruction, and details are not repeated any further herein. For example, the specific procedure may be as follows:

The device for data reconstruction is configured to obtain a data migration list, where the data migration list indicates a partition with data to be migrated on a storage node with data to be migrated; generate a data migration task according to the data migration list and routing table information, where the routing table information indicates correspondence between a storage node in a cluster and a partition; and concurrently execute data migration tasks of a storage node in the cluster to reconstruct data. For example, specifically, backup data may be copied, according to the data migration task, from a storage node that contributes data to a storage node that needs to steal data currently. Reference may be made to the foregoing method embodiment for details, which are not repeated any further herein.

Optionally, if a new storage node is faulty during data reconstruction, a new data migration list needs to be obtained, data migration tasks are integrated according to the new data migration list and the routing table information to obtain integrated data migration tasks, and then the integrated data migration tasks of the storage node in the cluster are concurrently executed to reconstruct data. That is to say, the device for data reconstruction is further configured to: when it is determined that a new data migration list is available, integrate data migration tasks according to the new data migration list and the routing table information to obtain integrated data migration tasks, and concurrently execute the integrated data migration tasks of a storage node in the cluster to reconstruct data.

The obtaining a data migration list may specifically include:

obtaining status information of the storage node in the cluster; adjusting a partition according to the status information of the storage node; updating the routing table information according to the partition adjustment result, where the routing table information indicates the correspondence between a storage node and a partition; and determining the data migration list according to the routing table information after update and the routing table information before update. The routing table may further indicate status information of each storage node.

The adjusting a partition according to the status information of the storage node may be specifically as follows:

if the status information of the storage node is not received within a preset time, determining that the storage node is a faulty storage node, and migrating a partition on the faulty storage node to another normal storage node.

The generating a data migration task according to the data migration list may specifically be as follows:

determining, according to the data migration list, a storage node with data to be migrated currently as a storage node that steals data; determining, by searching the routing table information, storage nodes that store backup data of a partition on the storage node with data to be migrated currently; selecting a storage node from the storage nodes that store the backup data as a storage node that contributes data; and generating the data migration task according to the storage node that steals data and the storage node that contributes data.

In addition, the storage system may further include one or more storage nodes, where the storage node is configured to store data and accept partition adjustment and data migration of the device for data reconstruction.

Reference may be made to the above embodiments for the specific implementation of the above devices, and details are not repeated any further herein.

As can be known from above, the device for data reconstruction according to this embodiment can obtain a data migration list, generate a data migration task according to the data migration list and routing table information, and then concurrently execute data migration tasks to reconstruct data. Because the data migration tasks of the storage node in the cluster can be concurrently executed, the data reconstruction efficiency can be improved. In addition, when it is determined that a new data migration list is available, data migration tasks can be integrated according to the new data migration list and the routing table information to delete identical data migration tasks. In this way, repeated data migration tasks can be avoided, data migration time is greatly reduced, and the data reconstruction efficiency is improved. Further, during the data reconstruction, read and write request operations are not affected, which ensures the storage system reliability.

A person of ordinary skill in the art may understand that, all or a part of the steps of the methods in the foregoing embodiments may be implemented by a program instructing relevant hardware. The program may be stored in a computer readable storage medium. The storage medium may include: a read-only memory (ROM, Read Only Memory), a random access memory (RAM, Random Access Memory), a magnetic disk, or an optical disc.

Detailed above are a method, a device, and a system for data reconstruction according to the embodiments of the present invention. Although the principles and implementation manners of the present invention are described through specific examples in this specification, the descriptions of the embodiments are only intended to help understand the method and core ideas of the present invention. Meanwhile, a person of ordinary skill in the art may make modifications to the specific implementation manners and application scopes according to the ideas of the present invention. Therefore, the content of the specification shall not be construed as a limitation to the present invention.

What is claimed is:

1. A method for data reconstruction in a cluster having a plurality of storage nodes, wherein each storage node includes a plurality of partitions, the method comprising:
   identifying, by a device, first partitions of a plurality of first storage nodes that store backup data of a first faulty storage node based on routing table information, wherein at least two partitions in the cluster store backup data for each partition of the first faulty storage node
   and wherein each first partition stores backup data for a corresponding partition of the first faulty storage node;
   generating, by the device, one or more first data migration tasks for migrating backup data from the first partitions of the plurality of first storage nodes to second partitions of a plurality of second storage nodes;
   identifying, by the device, a second faulty storage node and that the second faulty storage node is one of the first or second storage nodes in the one or more first data migration tasks;
   when the second faulty storage node is one of the first storage nodes in the one or more first data migration tasks, identifying a third partition of a third storage node which stores backup data for a first partition of the first faulty storage node, updating the one or more first data migration tasks by replacing a second partition of the second faulty storage node with the third partition of the third storage node;
   when the second faulty storage node is one of the second storage nodes in the one or more first data migration tasks, identifying one or more fourth storage nodes to store backup data for one or more partitions of the first faulty storage node, updating the one or more first data migration tasks by replacing the second faulty storage node with the one or more fourth storage nodes; and
   executing, by the device, the updated one or more first data migration tasks.

2. The method according to claim 1, further comprising:
   obtaining status information of the storage nodes in the cluster;
   adjusting a number of partitions according to the status information of the storage nodes in the cluster to obtain a partition adjustment result; and
   updating original routing table information according to the partition adjustment result to obtain the routing table information.

3. The method according to claim 1, further comprising:
   generating, by the device, one or more second data migration tasks for migrating backup data of the second faulty storage node from partitions of a plurality of fifth storage nodes to partitions of a plurality of sixth storage nodes, wherein the fifth storage nodes store the backup data of the second faulty storage node; and
   combining the updated one or more first data migration tasks and the second data migration tasks.

4. The method according to claim 3, wherein the combining the updated one or more first data migration tasks and the second data migration tasks comprises:
   adding the second data migration tasks to a migration task queue to which the updated one or more first data migration tasks belong; and
   executing tasks in the migration task queue substantially in parallel.

5. The method according to claim 2, wherein when status information of the second storage node is not received within a predetermined time period, determining, by the device, that the second storage node is a faulty storage node.

6. The method of claim 1, further comprising:
   executing, by the device, the updated one or more first data migration tasks substantially in parallel to reconstruct the first faulty storage node.

7. The method of claim 2, further comprising:
   determining a data migration list based on the original routing table information and the routing table information; and
   obtaining the second partitions of the plurality of second storage nodes based on the data migration list.

8. A device comprising:
   a memory storage comprising instructions; and
   one or more processors in communication with the memory,
   wherein the one or more processors execute the instructions to:
      identify first partitions of a plurality of first storage nodes that store backup data of a first faulty storage node based on routing table information, wherein at least two partitions in a cluster store backup data for each partition of the first faulty storage node
      and wherein each first partition stores backup data for a corresponding partition of the first faulty storage node;

generate one or more first data migration tasks for migrating backup data from the first partitions of the plurality of first storage nodes to second partitions of a plurality of second storage nodes;

identify a second faulty storage node and that the second faulty storage node is one of the first or second storage nodes in the one or more first data migration tasks;

when the second faulty storage node is one of the first storage nodes in the one or more first data migration tasks, identify a third partition of a third storage node which stores backup data for a first partition of the first faulty storage node, update the one or more first data migration tasks by replacing a second partition of the second faulty storage node with the third partition of the third storage node;

when the second faulty storage node is one of the second storage nodes in the one or more first data migration tasks, identify one or more fourth storage nodes to store backup data for one or more partitions of the first faulty storage node, update the one or more first data migration tasks by replacing the second faulty storage node with the one or more fourth storage nodes; and execute the updated one or more first data migration tasks.

9. The device according to claim 8, wherein the processors execute instructions to:

obtain status information of the storage nodes in the cluster;

adjust a number of partitions according to the status information of the storage nodes in the cluster to obtain a partition adjustment result; and update original routing table information according to the partition adjustment result to obtain the routing table information.

10. The device according to claim 8, wherein the processors execute instructions to:

generate one or more second data migration tasks for migrating backup data of the second faulty storage node from partitions of a plurality of fifth storage nodes to partitions of a plurality of sixth storage nodes, wherein the fifth storage nodes store the backup data of the second faulty storage node; and combine the updated one or more first data migration tasks and the second data migration tasks.

11. The device according to claim 10, wherein the processors execute instructions to:

add the second data migration tasks to a migration task queue to which the updated one or more first data migration tasks belong; and execute tasks in the migration task queue substantially in parallel.

12. The device according to claim 9, wherein the processors execute instructions to:

determine a data migration list based on the original routing table information and the routing table information; and obtain the second partitions of the plurality of second storage nodes based on the data migration list.

13. A non-transitory computer-readable storage medium storing instructions that, when executed by one or more processors, cause the one or more processors to perform operations including:

identifying first partitions of a plurality of first storage nodes that store backup data of a first faulty storage node based on routing table information, wherein at least two partitions in a cluster store backup data for each partition of the first faulty storage node and wherein each first partition stores backup data for a corresponding partition of the first faulty storage node;

generating one or more first data migration tasks for migrating backup data from the first partitions of the plurality of first storage nodes to second partitions of a plurality of second storage nodes;

identifying a second faulty storage node and that the second faulty storage node is one of the first or second storage nodes in the one or more first data migration tasks;

when the second faulty storage node is one of the first storage nodes in the one or more first data migration tasks, identifying a third partition of a third storage node which stores backup data for a first partition of the first faulty storage node, updating the one or more first data migration tasks by replacing a second partition of the second faulty storage node with the third partition of the third storage node;

when the second faulty storage node is one of the second storage nodes in the one or more first data migration tasks, identifying one or more fourth storage nodes to store backup data for one or more partitions of the first faulty storage node, updating the one or more first data migration tasks by replacing the second faulty storage node with the one or more fourth storage nodes; and executing, by the device, the updated one or more first data migration tasks.

14. The non-transitory computer-readable medium according to claim 13, wherein the operations include:

obtaining status information of storage nodes in the cluster;

adjusting a number of partitions according to the status information of the storage nodes in the cluster to obtain a partition adjustment result; and updating original routing table information according to the partition adjustment result to obtain the routing table information.

15. The non-transitory computer-readable medium according to claim 13, wherein the operations include:

generating one or more second data migration tasks for migrating backup data of the second faulty storage node from partitions of a plurality of fifth storage nodes to partitions of a plurality of sixth storage nodes, wherein the third storage nodes store the backup data of the second faulty storage node; and combining the updated one or more first data migration tasks and the second data migration tasks.

16. The non-transitory computer-readable medium according to claim 15, wherein the operations include:

adding the second data migration tasks to a migration task queue to which the updated one or more first data migration tasks belong; and executing tasks in the migration task queue substantially in parallel.

17. The non-transitory computer-readable medium according to claim 14, wherein the processors execute instructions to:

determine a data migration list based on the original routing table information and the routing table information; and obtain the second partitions of the plurality of second storage nodes based on the data migration list.

* * * * *